(12) United States Patent
Broach et al.

(10) Patent No.: US 6,952,093 B1
(45) Date of Patent: Oct. 4, 2005

(54) ADAPTIVE SMALL-SIGNAL COMPENSATION FOR SWITCHING REGULATORS

(75) Inventors: Michael Eugene Broach, San Mateo, CA (US); Frank John De Stasi, San Leandro, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 29 days.

(21) Appl. No.: 10/780,207

(22) Filed: Feb. 17, 2004

Related U.S. Application Data (63) Continuation-in-part of application No. 10/703,960, filed on Nov. 7, 2003.

(51) Int. Cl.$^7$ .......................... G01R 1/04; G01R 27/28; G05F 1/40
(52) U.S. Cl. ................... 324/158.1; 324/654; 323/282
(58) Field of Search .......................... 324/76.77, 76.79, 324/537, 630, 654, 765, 158.1; 323/282, 323/283, 287, 288; 363/56, 59, 60, 62; 361/42, 361/94

(56) References Cited

U.S. PATENT DOCUMENTS

| | | | |
|---|---|---|---|
| 4,127,894 A | 11/1978 | Bishop et al. | 363/56 |
| 4,439,822 A | 3/1984 | Cocconi | 363/56 |
| 5,481,178 A * | 1/1996 | Wilcox et al. | 323/287 |
| 5,969,513 A * | 10/1999 | Clark | 323/282 |
| 6,137,696 A * | 10/2000 | Hall et al. | 363/97 |
| 6,282,102 B1 | 8/2001 | Minamisawa et al. | 363/16 |
| 6,377,034 B1 * | 4/2002 | Ivanov | 323/287 |
| 6,424,132 B1 * | 7/2002 | Wrathall | 323/282 |
| 6,448,746 B1 * | 9/2002 | Carlson | 324/76.59 |
| 6,603,326 B1 * | 8/2003 | Tse et al. | 324/765 |
| 6,646,450 B2 * | 11/2003 | Liebler | 324/630 |
| 6,842,350 B2 * | 1/2005 | Yamada et al. | 363/56.01 |

OTHER PUBLICATIONS

Ronald I. Birdsall, "Proceedings of Powercon7," *Power Concepts, Inc.*, Mar. 24-27, 1980 (12 pages).
"LM2621 Low Input Voltage, Step-Up DC-DC Converter," *National Semiconductor Corporation*, Feb., 2000 (10 pages).
"LM78S40 Switching Voltage Regulator Applications," *National Semiconductor Corporation*, Mar., 2000 (17 pages).
"Wide-Input, High Voltage Buck Converter," *National Semiconductor Corporation*, Sep., 2002 (3 pages).
"Introduction to Power Supplies," *National Semiconductor Corporation*, Sep., 2002 (7 pages).
"Modeling, Analysis and Compensation of the Current-Mode Converter," *Unitrode Corporation* (7 pages).
"UC3842/3/4/5 Provides Low-Cost Current-Mode Control," *Unitrode Corporation* (14 pages).

* cited by examiner

*Primary Examiner*—Jermele Hollington
(74) *Attorney, Agent, or Firm*—Brett A. Hertzberg; Merchant & Gould PC (57) ABSTRACT

A system, method, and apparatus are arranged to provide small-signal compensation in a switching regulator that includes an inductor. A zero adjustment circuit is included in the system to introduce at least one zero in the closed-loop transfer function associated with the regulator. The zero adjustment circuit is responsive to a measurement signal, which is associated with one or more measured parameters associated with the inductor. By changing the location of at least one zero in response to the measurement signal it is possible to dynamically change the compensation based on variations in the inductance of the inductor. The zero adjustment circuit may be provided as a portion of the controller block of the regulator, or as a separate feedback circuit. The zero adjustment circuit can be implemented digitally as a portion of a DSP block, or as an analog function as may be desired in a particular system.

23 Claims, 12 Drawing Sheets

ADAPTIVE SMALL-SIGNAL COMPENSATION FOR SWITCHING REGULATORS

RELATED APPLICATION

This patent application is a continuation-in-part of U.S. patent application Ser. No. 10/703,960, which was filed Nov. 7, 2003, and claims the benefit under 35 U.S.C. 120 of the filing date.

FIELD OF THE INVENTION

The present invention relates to a system and method for adaptively adjusting the small-signal compensation in a switching regulator such as a buck regulator, a boost regulator, or a buck-boost regulator.

BACKGROUND OF THE INVENTION

Opposite polarity pulses can be applied to a transformer in a pulse-width-modulated (PWM) power converter. The secondary winding of the transformer is connected to additional circuitry such as a passive filter to generate an average output voltage. The average output voltage is related to the pulse-width by the volts-seconds rule and the characteristics of the transformer.

Figure 1:
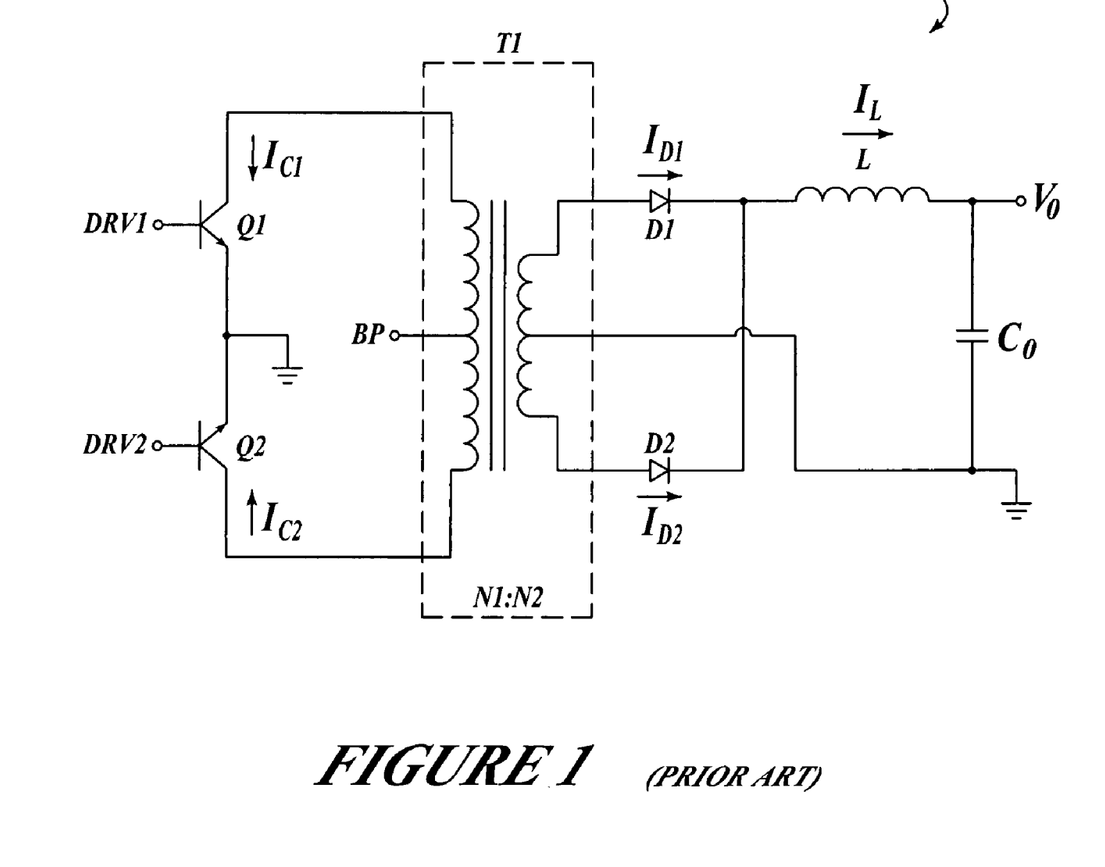
FIG. 1 is an illustration of a conventional push-pull type PWM converter.

An example push-pull type PWM converter is illustrated in FIG. 1. As illustrated in FIG. 1, transformer T1 conducts current (IC1, IC2) from the BP power supply terminal through transistors Q1 and Q2. For example, the primary winding of transformer T1 conducts current IC1 when transistor Q1 is activated, while the primary winding of transformer T1 conducts current IC2 when transistor Q2 is activated. Diodes D1 and D2 operate on opposite polarity cycles to provide current (either ID1 or ID2) through inductor L to a load (not shown). Capacitor C0 is filter ripple in the output voltage (VO).

Ideally, transistors Q1 and Q2 are activated for equal amounts of time via drive signals DRV1 and DRV2 such that the volt-second integral of the pulses applied to the transformer corresponds to zero and the transformer core does not saturate. However, non-ideal switching times for transistors Q1 and Q2 may result in unequal cycle times such that the transformer core is driven into saturation. Core saturation in a PWM converter may result in secondary effects such as breakdown in the switching transistors (Q1, Q2), excessive voltage and current stress on the rectifier diodes (D1, D2), as well as EMI related problems.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a system, method, and apparatus for providing small-signal compensation in a switching regulator that includes an inductor. A zero adjustment circuit is included in the system to introduce at least one zero in the closed-loop transfer function associated with the regulator. The zero adjustment circuit is responsive to a measurement signal, which is associated with one or more measured parameters associated with the inductor. By changing the location of at least one zero in response to the measurement signal, it is possible to dynamically change the compensation based on variations in the inductance of the inductor. The zero adjustment circuit may be provided as a portion of the controller block of the regulator, or as a separate feedback circuit. The zero adjustment circuit can be implemented digitally as a portion of a DSP block, or as an analog function as may be desired in a particular system.

Measured Inductor Characteristics

Inductors in switching electronic circuits are typically made out of ferrites or some other core material that has a higher permeability than air. Unlike air core inductors, the amount of current flowing in these inductors is constrained by the quality and quantity of the core material. Once the inductor's operating current exceeds a saturation point, the inductor's effectiveness is reduced and the rate of increase in the current relative to the applied voltage rises measurably. The inductor voltage ($V_L$) and the inductor current ($I_L$) are related to one another by: $\Delta I_L/\Delta t = \Delta V_l/L$.

Magnetic load applications such as motor drivers and switched-mode power supplied (SMPS) incorporate current limiting circuits to protect the control circuits (e.g., drivers, inductive elements, etc.) from currents that are sufficient to cause saturation and induce destructive currents. For example, in a SMPS the saturation current should always be greater than the current limit in the controller.

The various measurements of voltages and/or currents can be used to calculate values of characteristics associated with the inductor. Example characteristics include: inductor value, series resistance, slew rate in non-saturation, slew rate in saturation, as well as others. Inductors with different core materials have different characteristic curves (e.g., the saturation and non-saturation slew rates change based on the type of core material) such that the type of core material and the value of the inductor can be determined (e.g., a lookup table that identifies the core material type based on characteristic measurements). The characteristic measurements can also be used to in a control system such as in a switching-type converter (or regulator) to adaptively change control parameters such as: current limit, switching time, small signal compensation, and slope compensation.

Conventional circuits often include compensation to prevent undesirable effects such as oscillations, or some other instability or non-linearity in the control loop. In the present invention, characteristics associated with the inductor are measured and various control parameters associated with compensation of the circuit are dynamically adjusted by the control circuit to accommodate a wide range of inductor values and saturation ratings. In one example, a parameter in the control loop is dynamically adjusted (e.g., additional current sources are enabled, a feedback amount is changed, a gain is adjusted, etc.) to change the small signal compensation associated with the inductor. In another example, a parameter in the control loop is dynamically adjusted based on the rate of discharge in the inductor to change the slope compensation for the inductor.

Figure 2:
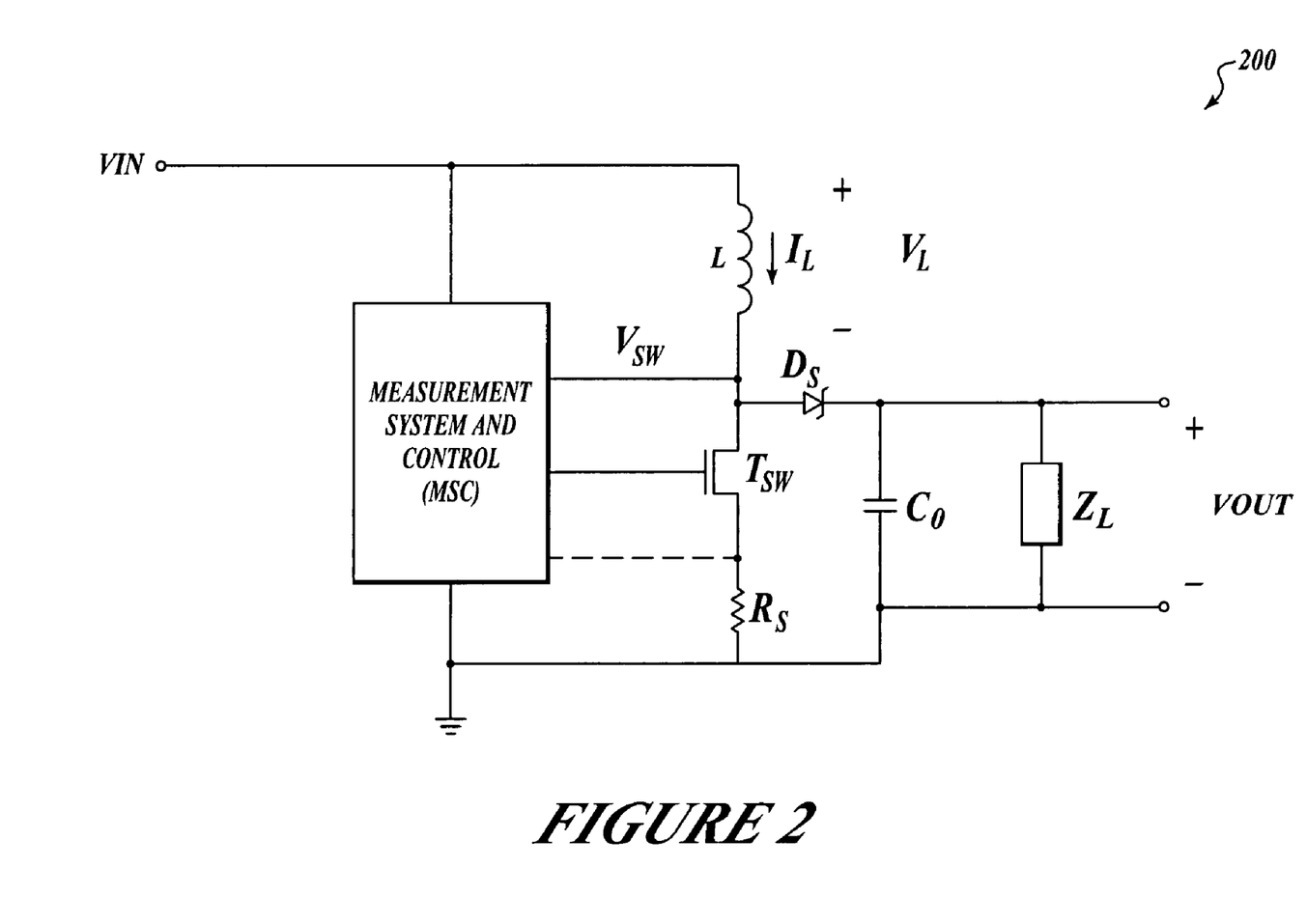
FIG. 2 is an illustration of an example embodiment of a switching converter.

FIG. 2 is an illustration of an example embodiment of a switching converter (200) that is arranged according to an aspect of the present invention. Switching converter 200 includes an inductor (L), a switching transistor ($T_{SW}$), a diode ($D_S$), a capacitor ($C_O$), a load circuit ($Z_L$), and a measurement and system control (MSC) block.

Inductor L is charged when switching transistor $T_{SW}$ is active. Inductor current ($I_L$) is delivered to capacitor $C_O$ and load circuit $Z_L$ via diode $D_S$ when transistor $T_{SW}$ is inactive. In a normal operating mode, the MSC block is arranged to actuate switching transistor $T_{SW}$ such that inductor L is periodically charged. The MSC block is further arranged to monitor the voltages and currents associated with inductor L when the switching converter 200 is operated in a measurement mode, and provides a measurement of the inductance value based on those measurements.

The change in inductor voltage ($\Delta V_L$) is determined by monitoring the input voltage ($V_{IN}$) and the switch voltage ($V_{SW}$). In one example embodiment, the change in inductor current ($\Delta I_L/\Delta t$) is determined by monitoring the change in voltage across the switching transistor ($\Delta V_{DS}$) and calculating: $(\Delta I_L/\Delta t) = (\Delta V_{DS}/\Delta t)/rdson$, where rdson is the on resistance of switching transistor $T_{SW}$. An optional resistor ($R_S$) may be placed in series with switching transistor $T_{SW}$ to facilitate measurement of the inductor current.

Figure 3:
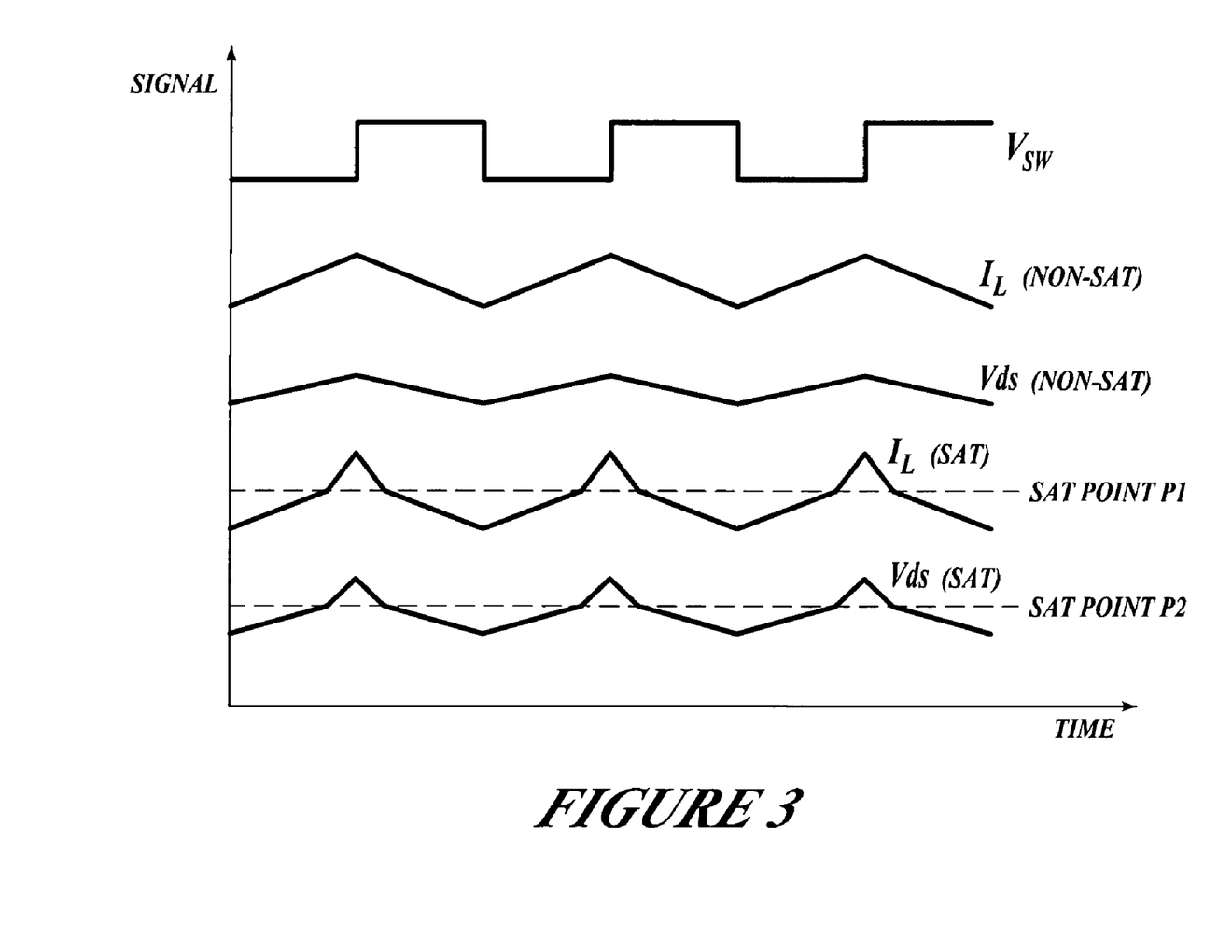
FIG. 3 is an illustration of example waveforms for a switching converter.

FIG. 3 is an illustration of example waveforms for a switching converter such as that illustrated in FIG. 2. Ideally, the inductor does not reach a saturation point and the inductor current ($I_L$) and the voltage across transistor $T_{SW}$ ($V_{DS}$) changes linearly in proportion to the value of the inductor. The non-ideal effects of inductor saturation are also illustrated as the inductor current ($I_L$) and the voltage across transistor TSW ($V_{DS}$) experience a measurable change in slope when the saturation points ($P_1$ and $P_2$) are reached. The voltage across resistor $R_S$ (when found in circuit 200) has the same shape as $V_{DS}$.

Figure 4:
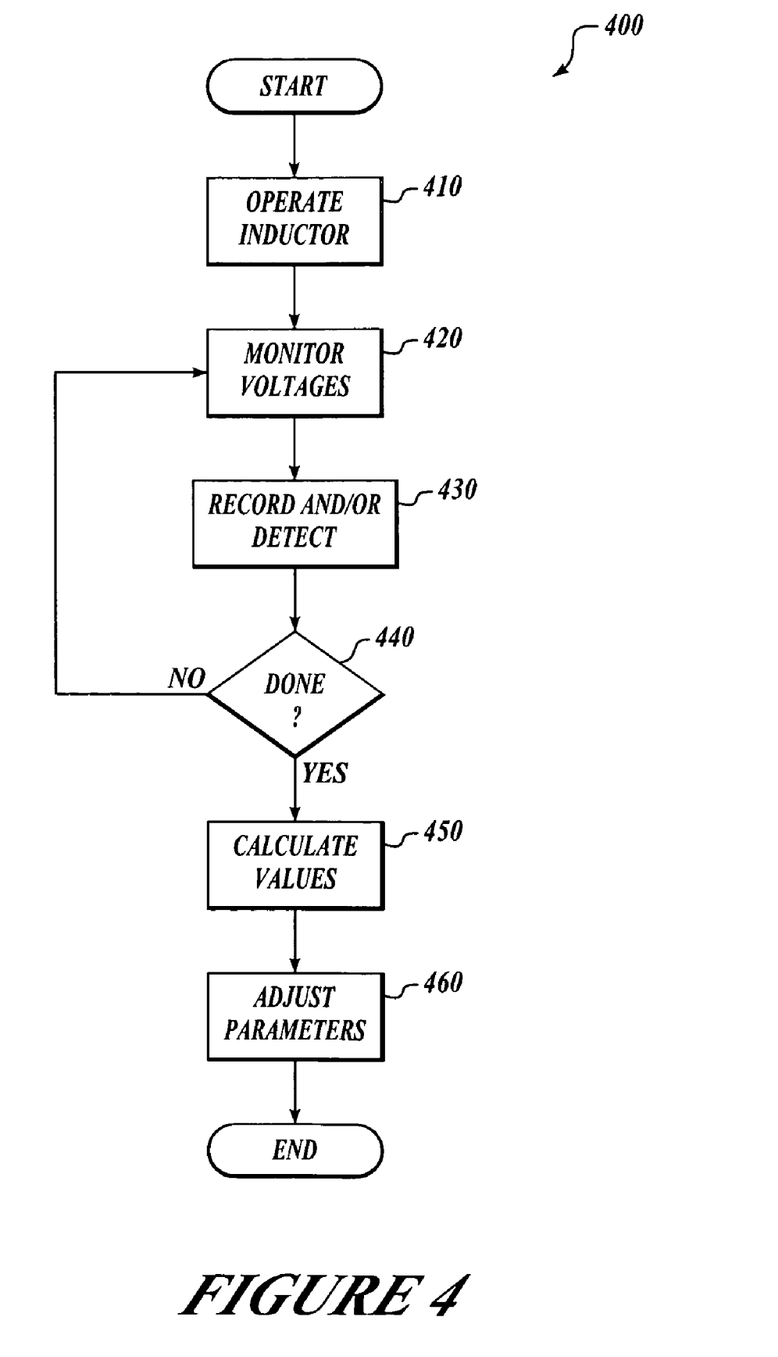
FIG. 4 is an illustration of a procedural flow for an example measurement system.

FIG. 4 is an illustration of a procedural flow for an example measurement system that is arranged according to an aspect of the present invention. After the measurement mode is activated by some triggering event, processing continues at block 410 where the inductor is operated for one or more cycles. At block 420, voltages (e.g., $V_{IN}$, $V_{SW}$, $V_{DS}$, $V_{RS}$, etc.) associated with the inductor are monitored (420) while the inductor is operated. At block 430, the monitored voltages are recorded and/or used to detect the saturation point (depending on the circuit implementation). From decision block 440, the process returns to block 420 when additional monitoring is necessary. Processing continues to block 450 when no additional voltages need be monitored. At block 450, values associated with the inductor (e.g., inductance value, slew rate, saturation point, etc.) are calculated. The calculated values can be used by other circuits or systems to adjust one or more parameters (e.g., small-signal compensation, current limit, slope compensation, etc).

In one example, voltages are monitored by an analog-type circuit that detects the slope associated with the current and/or voltage associated with the inductor. In another example, the inductor voltages and/or currents are monitored by an analog-to-digital converter. In this example, either the digital values can be recorded in a memory and later retrieved for calculation purposes, or the digital values can be evaluated in real time. In a further example, the digital values can be processed (e.g., averaged, throwing out extreme values, filtered, etc.) over many operating cycles of the inductor to minimize the effects of noise and switching transients on the measurement values. The processing of the digital values can be provided as a post-processing function or in real-time based on the processing power of the system implementation.

Figure 5:
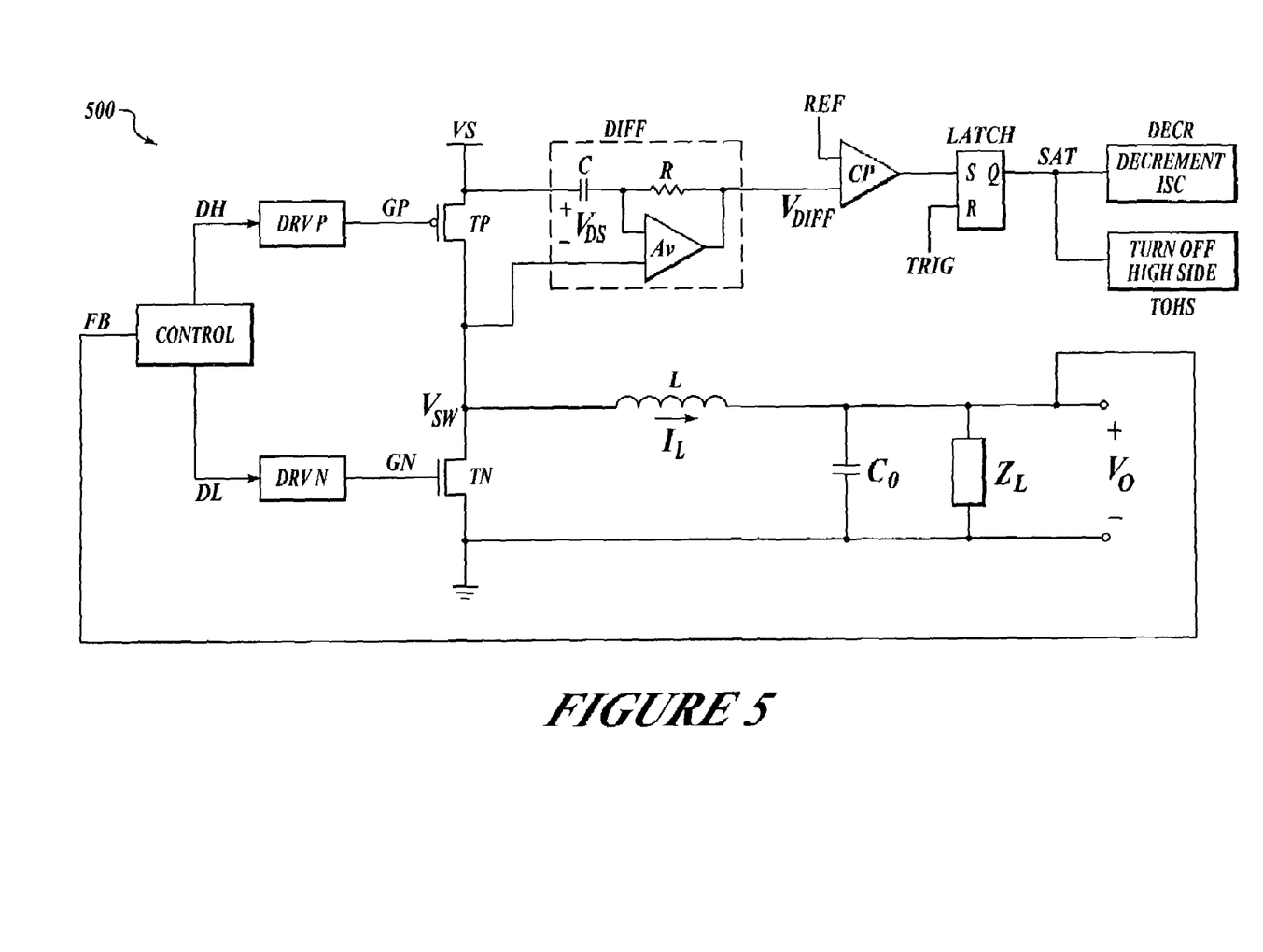
FIG. 5 illustrates another example embodiment of a switching converter with analog differentiator processing system.

FIG. 5 illustrates another example embodiment of a switching converter (500) that is arranged in accordance with an aspect of the present invention. Switching converter 500 is buck-type converter that includes a p-type transistor ($T_P$), an n-type transistor ($T_N$), drivers ($DRV_P$, $DRV_N$), a controller (CNTL), a differentiator (DIFF), a comparator (CP), an SR-type latch (LATCH), a decrement circuit (DECR), a high-side turn-off circuit (TOHS), an inductor (L), a capacitor ($C_O$), and a load circuit ($Z_L$).

The controller (CNTL) is arranged to provide drive signals $D_H$ and $D_L$ to drivers $DRV_P$ and $DRV_N$, respectively. Driver DRVP provides a gate control signal ($G_P$) to p-type transistor $T_P$, while driver DRVN provides another gate control signal ($G_N$) to n-type transistor $T_N$. The p-type transistor ($T_P$) is arranged to operate as a high side switch that couples the inductor (L) to the high power source ($V_S$). The n-type transistor ($T_N$) is arranged to operate as a low side switch that couples the inductor (L) to the low power source (GND). Capacitor $C_O$ is coupled in parallel with load circuit $Z_L$, which provide a feedback signal (FB) from $V_O$ to the controller (CNTL).

An example differentiator illustrated in FIG. 5 includes a capacitor (C), a resistor (R), and an amplifier ($A_V$). The differentiator is arranged to monitor the drain-source voltage ($V_{DS}$) of p-type transistor $T_P$ and provide a signal ($V_{DIFF}$) that is proportional to $\Delta V_{DS}/\Delta t$. The signal ($V_{DIFF}$) is used to adjust parameters within the circuit such as, for example, small-signal compensation, slope compensation, and current limit.

Figure 6:
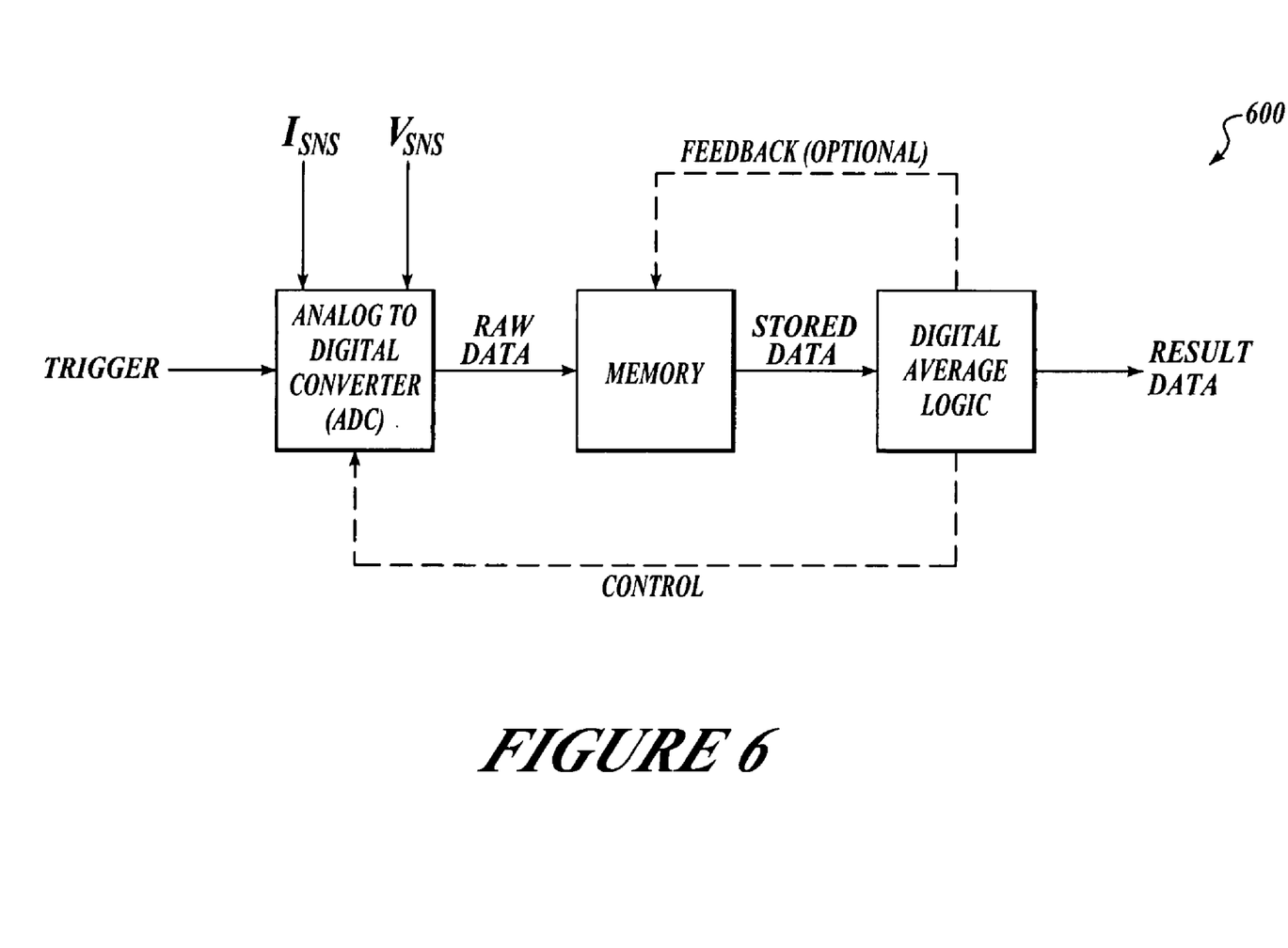
FIG. 6 illustrates an example of a digital processing circuit.

FIG. 6 illustrates an example of a digital processing circuit (600) that is arranged in accordance with aspects of the present invention. The digital processing circuit (600) includes an analog-to-digital converter (ADC) circuit, a memory circuit, and a digital processing logic (DPL) circuit. The ADC circuit is activated by a trigger mechanism (TRIGG) and converts a series of measurement signals (ISNS, VSNS, etc) to a data stream (raw data). The data stream is received by the memory circuit for storage. Data in the memory circuit can be retrieved by the DPL circuit for further processing.

In one example, the memory circuit stores sampled data points that are utilized to find the value of $\Delta V_{DS}/\Delta t$, where the DPL circuit is arranged to calculate the value after all of the sampled points are stored. In another example, the memory circuit stores values that correspond to an average value, and the DPL circuit calculates a running average. The DPL circuit can further be arranged to: locate the saturation point of the inductor, calculate the slope of the inductor current, filter noise from the sampled data, discard anomalous data from the sampled data points, determine an appropriate current limit, determine a slope compensation parameter(s), determine a small-signal compensation parameter(s), as well as provide other calculations.

Small Signal Compensation Generally

Switching regulators (e.g., buck, boost, and buck-boost type converters) are closed-loop systems that are designed to accept a variable input voltage ($V_{IN}$) and provide a constant output voltage ($V_{OUT}$) to a variable load ($Z_L$). A power inductor is periodically charged by one or more switching devices (e.g., power FETs), where the power inductor is arranged to provide current to the load (ZL) such as illustrated by FIGS. 1–6. The output voltage may be sensed (e.g., through a feedback network) and provided to a controller block that controls the switching times of the inductor to achieve regulation. The closed-loop operation of the regulator requires small-signal compensation to maintain a stable steady-state operating point for regulation.

The parameters for the small-signal compensation network are dependent on many system parameters, including but not limited to the value associated with the power inductor. The output capacitor (e.g., C) and load resistance combine with the power inductor to form a damped second-order pole in the loop transfer function of the regulator. The second-order pole is located at a frequency ($f_O$) that is approximately given by: $f_O=1/(2\pi\sqrt{LC})$, where L corresponds to the value of the power inductor and C corresponds to the value of the output capacitor.

The second-order pole in the loop-transfer function is well damped in switching regulators that employ current programming (CPM). The damped response results in a loop transfer function with two well-separated poles. However, the location of the second-order pole in the loop transfer function for switching regulators that employ voltage mode control is predominately determined by the load resistance and other parasitic resistances in the system. The resulting loop transfer function may have a pole with a high Q value, potentially yielding instabilities in the system. The controller in the voltage mode control system typically includes a high gain amplifier with a low-frequency dominant pole. The low-frequency dominant pole limits the overall bandwidth of the system, while the high DC gain of the amplifier provides good static regulation. Since the amplifier includes a low-frequency dominant pole, the overall loop transfer function includes two poles (one second order pole and one low frequency pole) such that two small signal zeroes are required to properly compensate for stability. By placing the first zero slightly below $f_O$ and the second zero slightly above $f_O$ the effects of the second order pole can be mitigated. The resulting loop transfer function has a loop gain that is "quasi" first-order dominated by the high gain and low frequency pole of the controller.

The value associated with the inductor (L) can vary during operation. This is largely the result of the various materials that are used in the inductor. Many power inductors are built with a core material that exhibits some change in permeability with flux density. The flux density depends on the magnitude of operating current in the inductor. In a regulator system, the inductor current is largely dependent on the load current for the system. Since the load current may change over time, the flux density of the inductor will change accordingly.

The locations of the second-order poles are determined in part by the value of the power inductor (L). For example, $f_O$ decreases for increasing values of inductance, while $f_O$ increases for decreasing values of inductance. Since the value associated with the power inductor can change (e.g., either by a designer physically changing the inductor, operational load condition variations, or some other operational shift in inductance value), the location of the compensating zeros ideally should track changes in the values of inductance. As described previously, a measurement signal can be generated that is proportional to a value associated with the inductor (L). According to the present invention, the measurement signal is used to adjust the small-signal compensation of the loop transfer function in the switching regulator to compensate for changes in inductance. By dynamically adjusting the small signal compensation, large variations in the inductance value (L) can be accommodated without changing the internal constants of the switching regulator.

Example Regulator System

Figure 7:
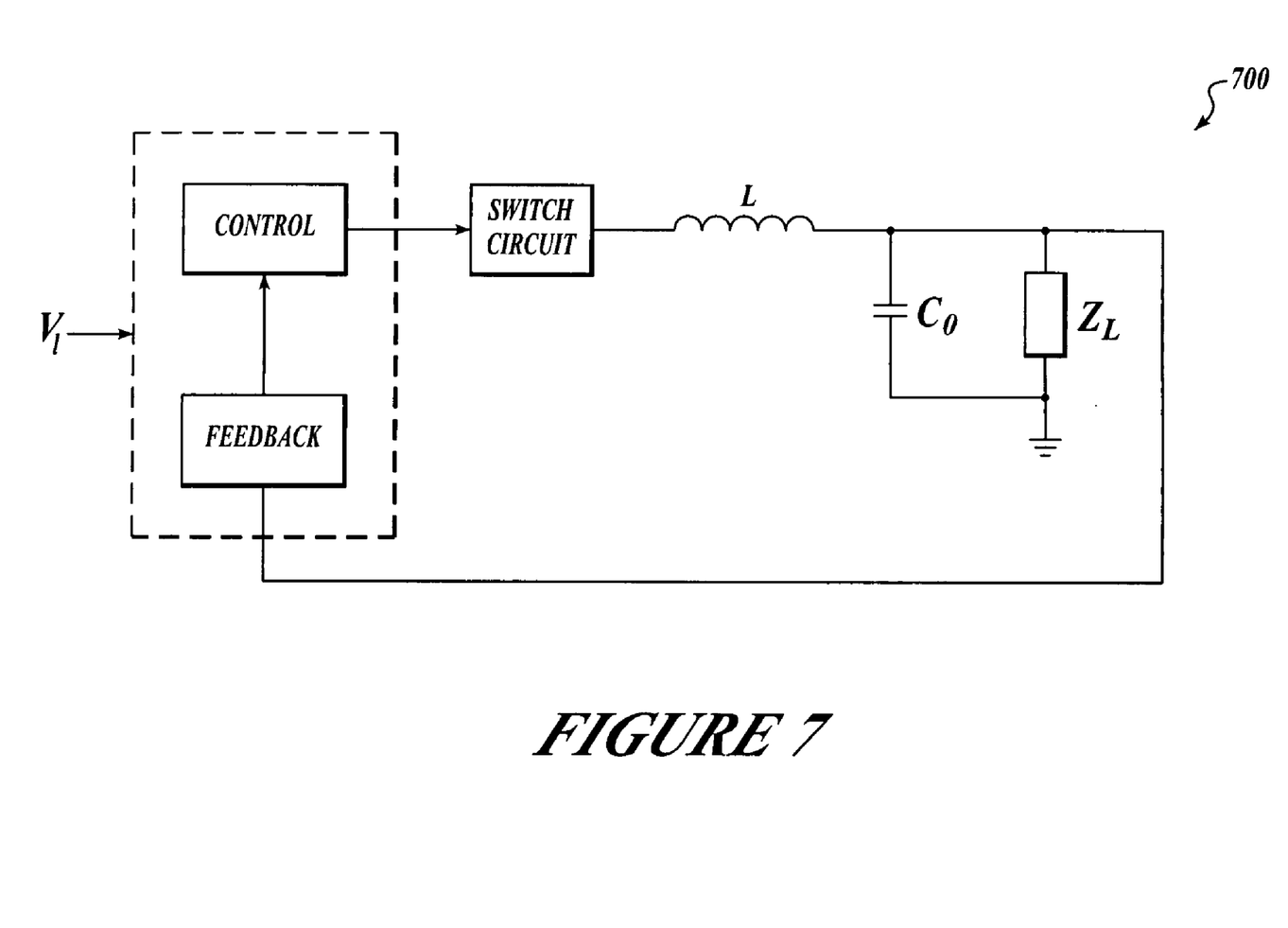
FIG. 7 illustrates an example regulator system.

FIG. 7 illustrates an example regulator system (700) that is arranged according to an aspect of the present invention. The example regulator system includes an inductor (L), a capacitor (C), a load ($Z_L$), a switch circuit, a control circuit, and a feedback circuit. Inductor L is arranged to store energy that is delivered to the load when activated by the switch circuit. The switch circuit is responsive to drive signals that are provided by the control circuit. The feedback circuit is arranged to sense the output voltage of the regulator. The control circuit and the feedback circuit are arranged to cooperate with one another to control the charging cycle time of the inductor to maintain proper regulation.

In operation, the control circuit and/or the feedback circuit are responsive to a measurement signal ($V_1$). The measurement signal ($V_1$) is related to one or more parameters associated with the inductor (e.g., an inductance value). Regulator system 700 has a loop transfer function that includes at least one second-order pole that may require compensation during operation. The small-signal compensation associated with the loop transfer function is adjusted by varying a parameter in at least one of the control circuit and the feedback circuit.

The feedback circuit may be implemented as a separate block or as a portion of the control circuit as illustrated by the dashed line in FIG. 7. Example feedback circuits include: a passive voltage divider circuit, an active voltage divider circuit, and an amplifier or gain circuit, to name a few. The feedback circuit and/or the control circuit can be further arranged to respond to the measurement signal ($V_1$) such that an adjustable zero is introduced into the loop transfer function of the regulator system.

RC Small-Signal Compensation

The time constants of the zeroes in the regulator system can be controlled by the values associated with various passive components such as resistors (R) and capacitors (C). For example, a zero can be introduced into the loop transfer function by the feedback circuit with an RC network, where the values associated with the RC network are responsive to changes in inductance via a measurement signal.

Figure 8:
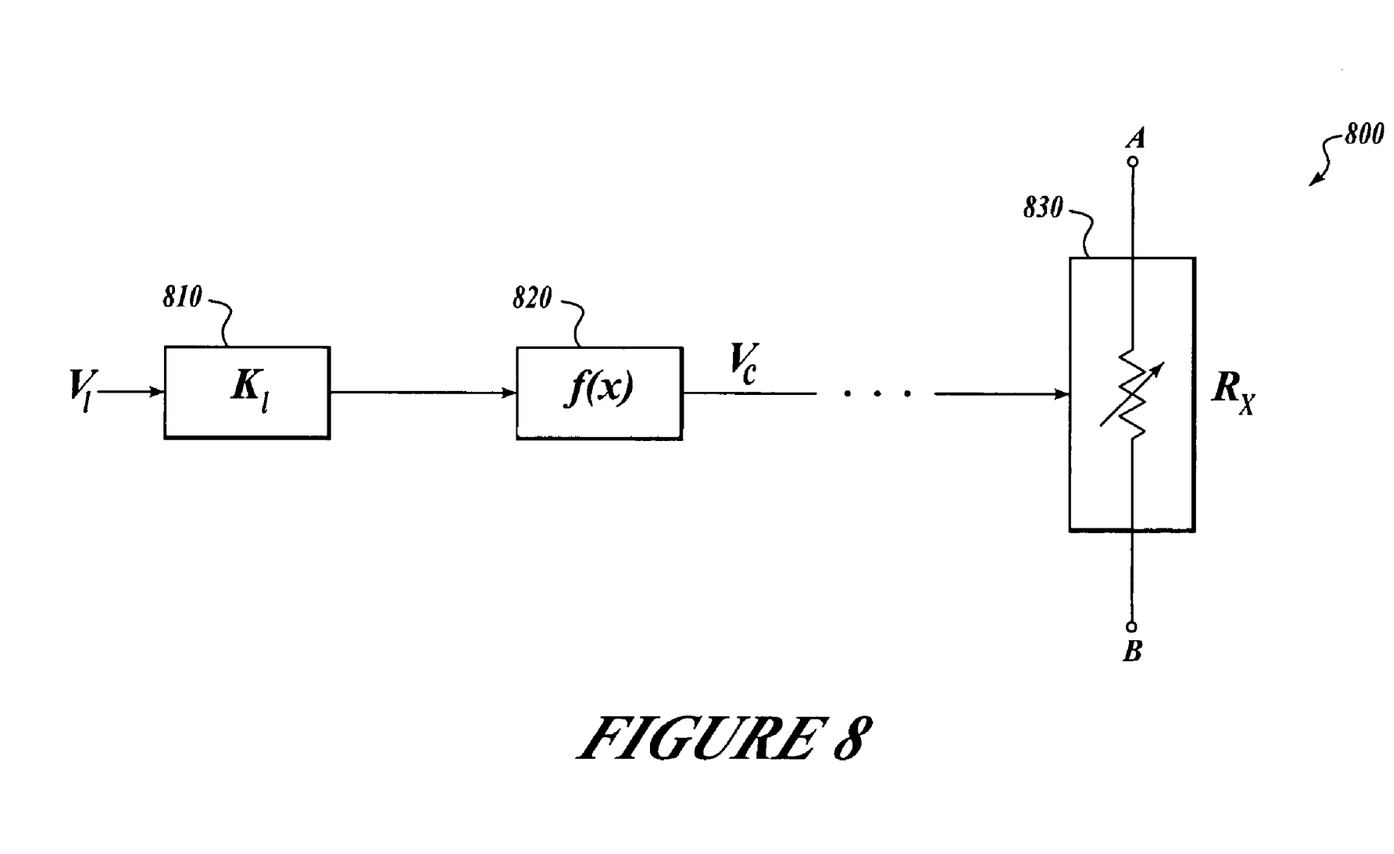
FIG. 8 illustrates an example block diagram for a system that employs a resistance adjustment means.

FIG. 8 illustrates an example block diagram for a system that employs a resistance adjustment means (800). The example resistance adjustment means (800) includes a gain block (810), a function block (820), and an adjustable resistor circuit (830). A measurement signal ($V_1$) is provided to gain block 810 to provide a scaled measurement signal, where the scaled measurement signal is related to the measurement signal according to a scaling factor ($K_1$). The scaled measurement signal is coupled to function block 820, which is arranged to provide a control signal ($V_C$) according to function f(x). Additional processing blocks may be provided between the function block (820) and the adjustable resistor circuit (830) as may be required for proper signal conditioning such as: filtering, curvature adjustment, etc. Adjustable resistor circuit 830 has an associated resistance value ($R_X$) measured between two terminals (A and B), where resistance value $R_X$ is responsive to control signal ($V_C$).

Function f(x) may be used to provide signal conditioning to the scaled measurement signal ($V_1 \cdot K_1$) such that the adjustment range for the system zero (i.e., adjustment range of the time constant) is appropriate for a desired range of inductance values. F(x) may depend on: the transfer function from $V_C$ to $R_X$, the transfer function from Rx to the zero time constant, a processing function that places the control signal in the proper form for compensating for changes in inductance value.

Example Adjustable Resistance Circuit

Figure 9:
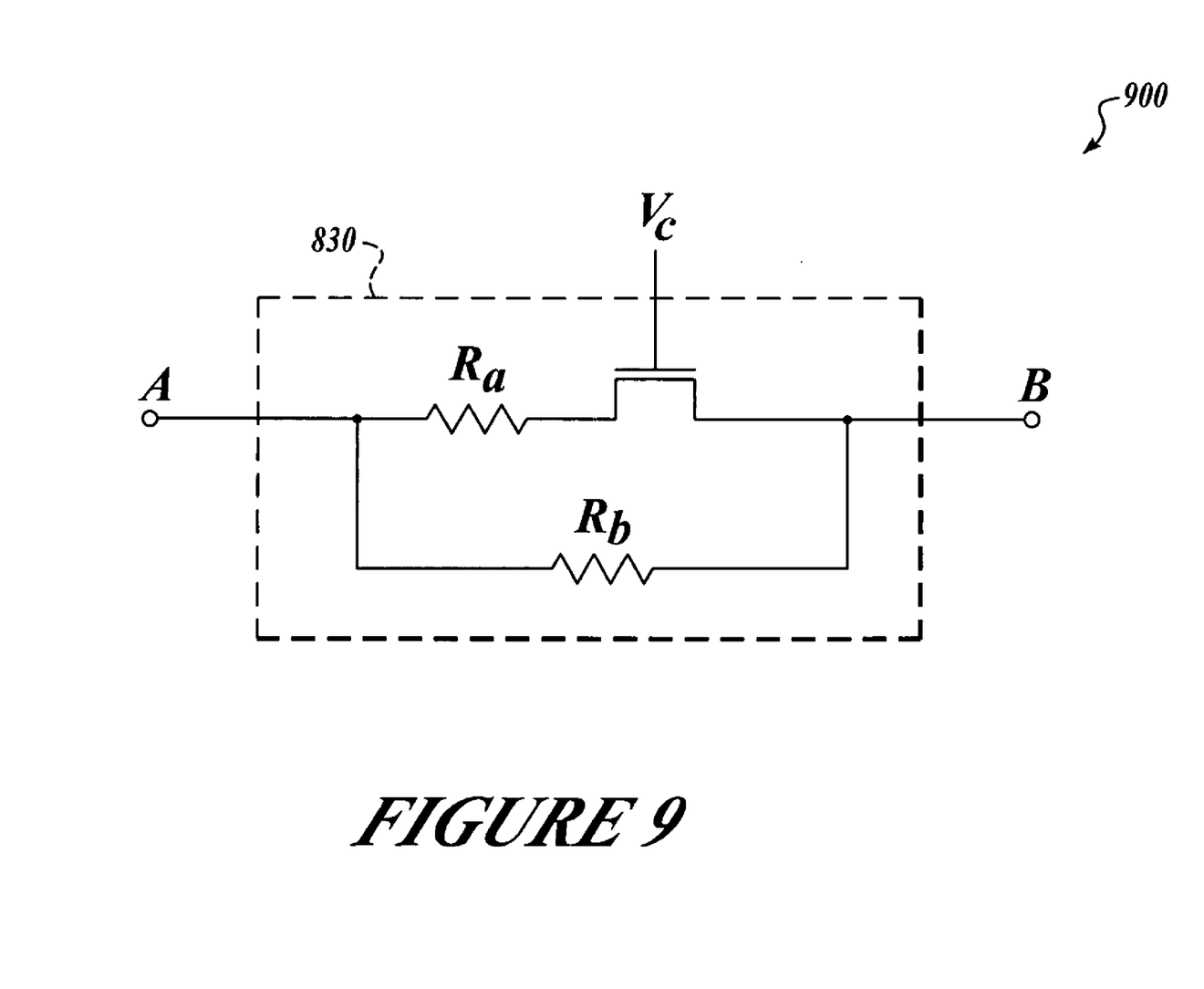
FIG. 9 illustrates a schematic diagram (900) for an example adjustable resistor circuit.

FIG. 9 illustrates a schematic diagram (900) for an example adjustable resistor circuit (830) that is arranged according to an aspect of the present invention. The adjustable resistor circuit (830) includes two resistors and a transistor. The transistor and the first resistor are series coupled to one another to form a first resistance circuit between terminals A and B. The second resistor is series coupled between terminals A and B to operate as a second resistance circuit. The overall resistance between the two terminals (A and B) corresponds to the parallel combination of the two resistance circuits.

The first resistor has a value corresponding to Ra, while the second resistor has a value corresponding to Rb. In operation, a control signal ($V_C$) is applied to the control terminal of the transistor such that the series resistance associated with the transistor is adjusted. In one example, the transistor's series resistance varies over an approximate range of open circuit ($\infty$ impedance) to short circuit (0 ohms).

The first resistor may either be a physical resistor that is series coupled to the transistor, or a representative resistance associated with the transistor. Additional examples of adjustable resistance circuits include: a single resistance circuit (e.g., eliminate resistor Rb), a series and/or parallel array of identically sized selectable transistors, a series and/or parallel array of relatively scaled selectable transistors, a series and/or parallel array of identically sized selectable resistors, and a series and/or parallel array of relatively scaled selectable resistors.

In each example adjustable resistance circuit, the effective resistance between terminals A and B is varied in response to the measurement signal, where the measurement signal may either be an analog signal or a digital signal depending on the implementation of the resistance adjustment mechanism. In one example, an array of selectable resistances are arranged to provide discrete resistance levels that are selected by one or more digital control signals. In another example, an array of selectable transistors, each with their own inherent resistance, are arranged to provide discrete resistance levels that are selected by one or more digital control signals. In still another example, an array of transistors are arranged to change their effective resistance in response to an analog control signal.

First Example Zero-Adjustment Circuit

Figure 10:
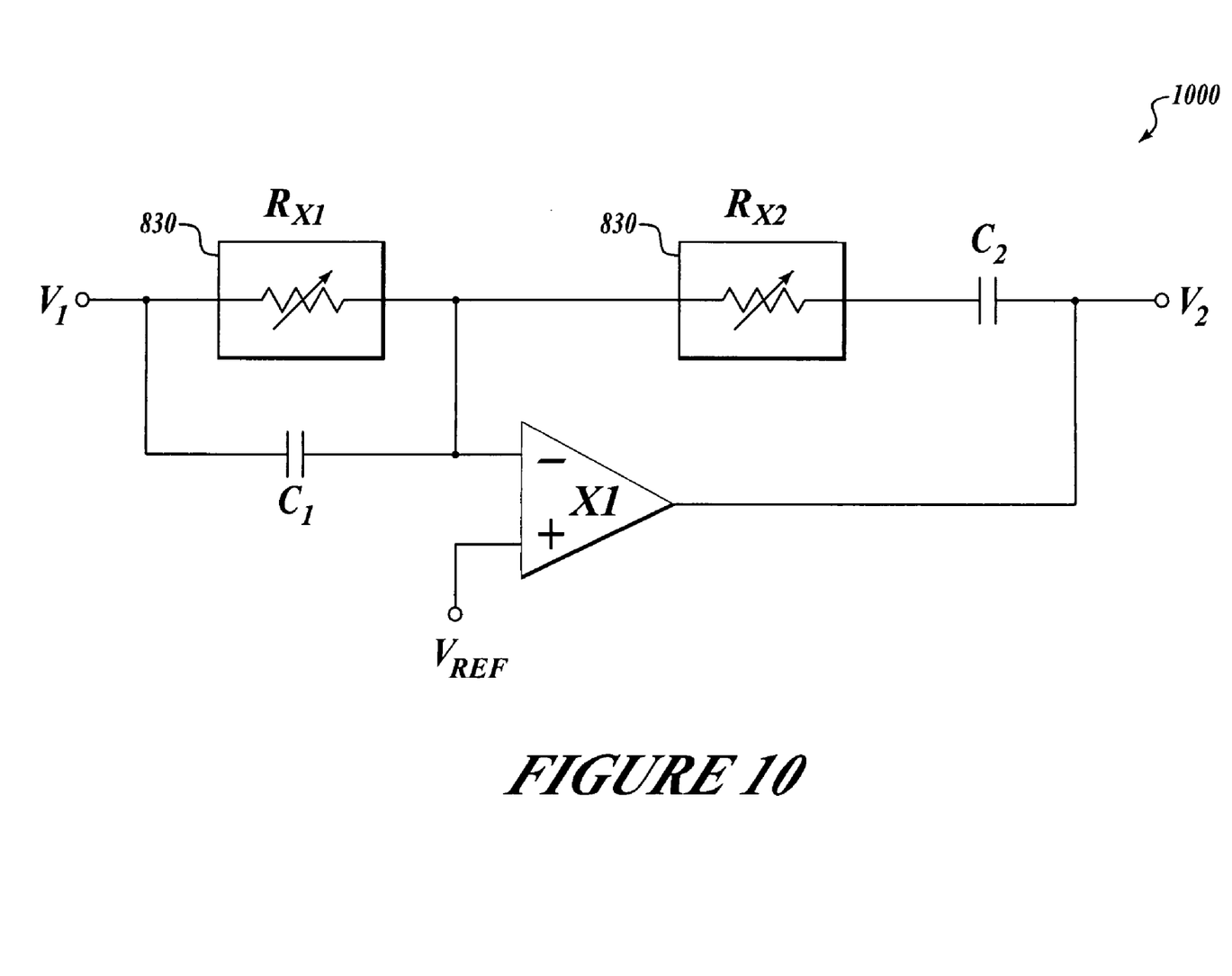
FIG. 10 illustrates a schematic diagram for an example zero adjustment circuit.

FIG. 10 illustrates a schematic diagram for an example zero adjustment circuit (1000) that is arranged according to an aspect of the present invention. The zero-adjustment circuit (1000) includes two adjustable resistor circuits (830), two capacitor circuits ($C_1$, $C_2$), and an amplifier circuit ($X_1$).

The first adjustable resistor circuit is coupled between a signal input terminal ($V_1$) and an inverting input terminal of amplifier circuit $X_1$. The first capacitor circuit ($C_1$) is coupled in parallel with the first adjustable resistor circuit. The second adjustable resistor circuit is series coupled between the inverting input terminal of amplifier circuit $X_1$ and capacitor $C_2$, where capacitor $C_2$ is also coupled to a signal output terminal ($V_2$) that is associated with an output of amplifier circuit $X_1$. The non-inverting input terminal of amplifier circuit $X_1$ is arranged to receive a reference signal ($V_{REF}$). Reference signal $V_{REF}$ may correspond to: a ground reference potential (e.g., 0Volts), a constant signal that represents the desired output voltage (e.g., $V_{OUT}$) of the regulator, or a signal that is proportional to the output voltage (e.g., $V_{OUT}$) of the regulator through some kind of feedback arrangement (e.g., a resistor divider).

The zero-adjustment circuit (1000) has an associated transfer function between the signal input terminal ($V_1$) and the signal output terminal ($V_2$) that is suitable for insertion into the feedback loop (e.g., as a portion of the controller or a portion of the feedback circuit) of a switching regulator. For example, the zero-adjustment circuit (1000) may be arranged to operate as part of a PWM controller to cancel a zero in the closed loop response.

The adjustable resistor circuits (830) have resistance values (e.g., $R_{X1}$, $R_{X2}$) that are responsive to control signals that are related to one or more measurement signals (e.g., $V_1$) as previously described with respect to FIGS. 7–9. The resistance values ($R_{X1}$, $R_{X2}$) may be controlled together or independently by the previously described methods. The resulting time constants for the zeros in the loop transfer function (or time constants t1, t2) can be adjusted to track the inductance value of the power inductor.

Second Example Zero-Adjustment Circuit

Figure 11:
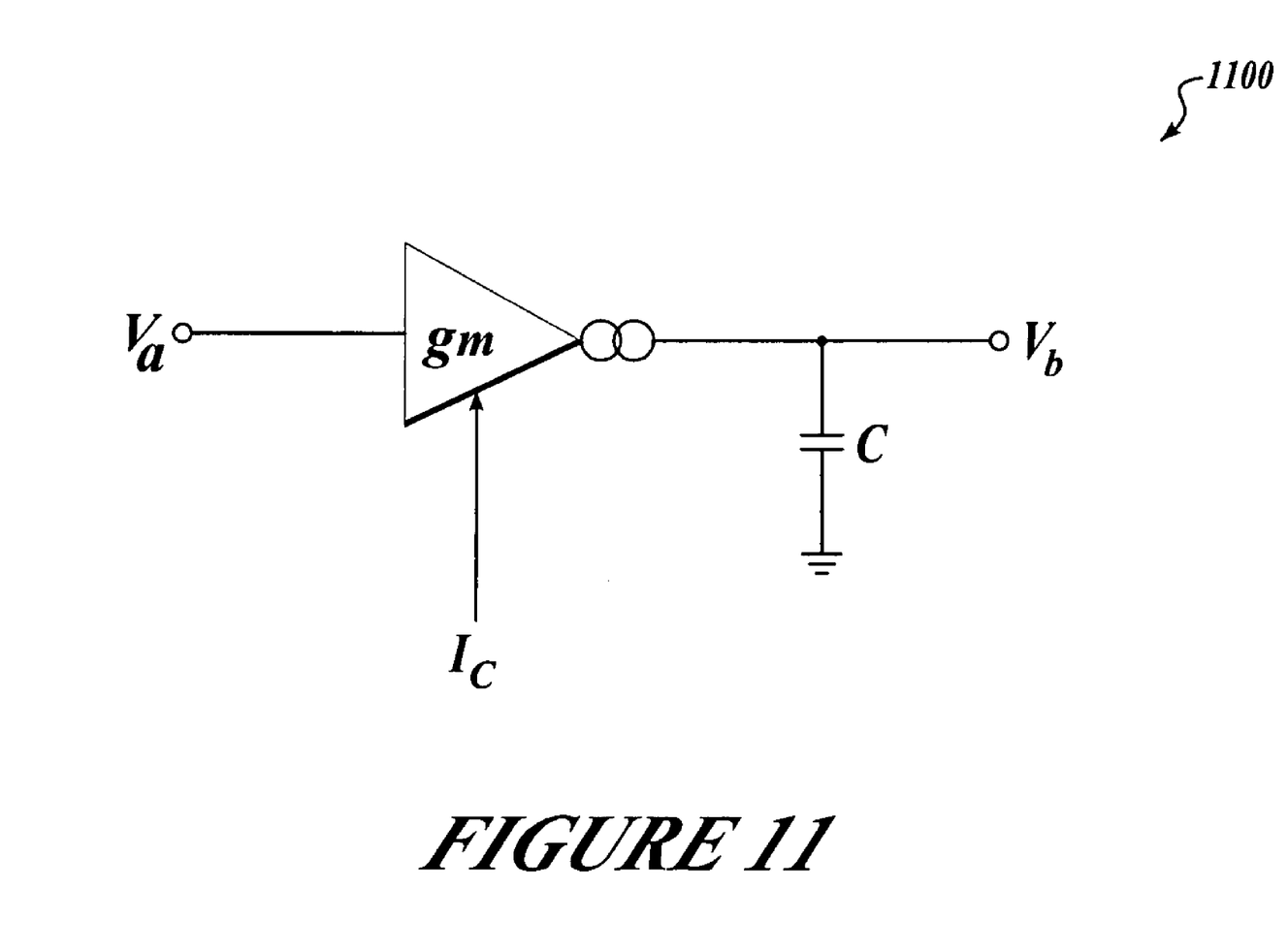
FIG. 11 illustrates a schematic diagram for another example zero adjustment circuit.

FIG. 11 illustrates a schematic diagram for another example zero adjustment circuit (1100) that is arranged according to an aspect of the present invention. The zero-adjustment circuit (1100) includes a controlled transconductance cell ($g_m$) and a capacitor (C).

The transconductance cell includes a signal input terminal (Va) a control terminal, and a signal output terminal (Vb). The capacitor (C) is coupled between signal output terminal (Vb) and a ground terminal. The control terminal is arranged to receive a control signal ($I_C$).

The transconductance cell and the capacitor are configured to operate as a $g_m$-C type filter, which is sometimes referred to as a log-domain filter. The time constants associated with the $g_m$-C filter are changed in response to the control signal, which usually corresponds to a current ($I_C$).

The basic building block of the filter is the integration function that is provided by the transconductance cell and the capacitor. The transconductance cell receives a small-signal input voltage from the signal input terminal (Va), and converts the signal into a small-signal current. The time constant associated with the integration function is determined by $C/g_m$. The gm of the transconductance cell changes in response to the control signal (e.g., control current $I_C$) such that the time constant of the integrator is adjusted. By combining this integrator with other functional blocks such as summers, subtractors, dividers, and/or multipliers, any desired filter function can be achieved. Since the transconductance cell is responsive to control signals, a measurement control signal can be applied to the control terminal such that the small-signal compensation for the regulator can be dynamically adjusted.

Third Example Zero-Adjustment Circuit

Figure 12:
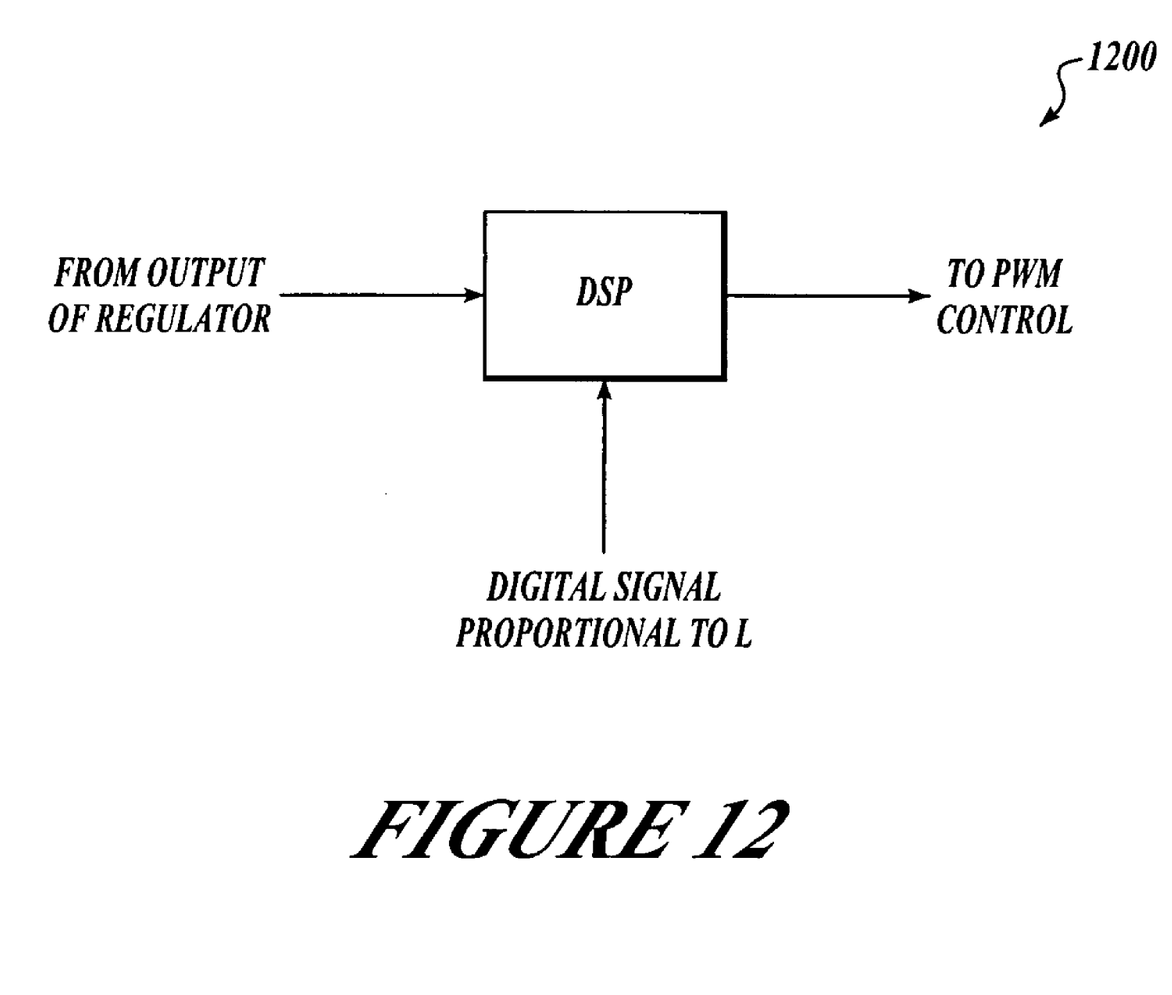
FIG. 12 illustrates a schematic diagram for still another example zero adjustable circuit, arranged in accordance with aspects of the present invention.

FIG. 12 illustrates a schematic diagram for still another example zero adjustable circuit (1200) that is arranged according to an aspect of the present invention. The zero-adjustment circuit (1200) includes a digital-signal-processing (DSP) block that is arranged to change one or more control signals in a PWM controller (e.g., see FIGS. 1–7). The DSP block may be placed in the feedback path between the output of the switching regulator and the PWM controller block.

The DSP block may include functional blocks such as: analog-to-digital-converter (ADC), digital-to-analog converter (DAC), analog filtering, digital filtering, as well as many other signal processing functions. The constants associated with the DSP function blocks (i.e. filter time constants) can be adjusted in response to a digital signal that is associated with the inductor. The small-signal compensation of the regulator can be dynamically adjusted with changes in inductance when the digital signal that is provided to the DSP block is proportional to the value of the power inductor.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for adjusting small-signal compensation in a switching regulator that includes an inductor and a switching circuit that is arranged to provide selective charging of the inductor, the apparatus comprising:
   a measurement circuit that is arranged to provide a measurement signal ($V_1$) that in associated with operating conditions for the inductor;
   a feedback circuit that is arranged to provide a feedback signal in response to an output signal that is associated with the switching regulator;
   a control circuit that is arranged to provide a drive signal to the switching circuit to effect selective charging of the inductor, wherein the feedback circuit and the control circuit are arranged in a feedback loop of the switching regulator such that the switching regulator has a loop transfer function with a second-order pole and a zero, wherein a location associated with the zero is dynamically adjusted by at least one of the feedback circuit and the control circuit in response to the measurement signal to counteract the effect of the second-order pole on stability of the switching regulator.

2. The apparatus of claim 1, wherein a location associated with the second-order pole is determined by a value associated with the inductor, and wherein at least one of the feedback circuit and the control circuit are arranged to respond to changes in the value associated with the inductor to accommodate a range of values for the inductor.

3. The apparatus of claim 1, wherein the value associated with the inductor changes based on at least one of: on operating current associated with the inductor, an input voltage associated with the switching regulator, an output voltage associated with the switching regulator, and a load condition associated with the regulator, and wherein at least one of the feedback circuit and the control circuit are arranged to respond to the measurement signal such that the zero is dynamically adjusted in response to changes in the value associated with the inductor.

4. The apparatus of claim 1, further comprising: a resistor circuit and a capacitor circuit that are included in the feedback circuit, wherein the resistor circuit and a capacitor circuit that are arranged to provide a zero in the loop transfer function of the switching regulator, and wherein the feedback circuit is arranged such that a value associated with at least one of the resistor and the capacitor is adjusted in response to the measurement signal such that the location of the zero changes in response to the measurement signal.

5. The apparatus of claim 1, the feedback circuit comprising: a gain block, a function block and an adjustable resistor circuit, wherein the gain block is arranged to receive the measurement signal and provide a scaled measurement signal, the function block is arranged to provide a control signal that is responsive to the scaled measurement signal, and the adjustable resistor circuit has an associated resistance value that is responsive to changes in the control signal, wherein changes in the resistance value results in an associated change in the location of the zero.

6. The apparatus of claim 5, wherein the adjustable resistance circuit comprising: a transistor and a resistor, wherein the resistance circuit is coupled in parallel with the transistor circuit, and the transistor includes a control terminal that is responsive to the control signal such that the effective resistance associated with the adjustable resistance circuit is responsive to changes in the control signal.

7. The apparatus of claim 1, the control circuit comprising: an amplifier circuit, two capacitor circuits, a two resistor circuits, wherein: a first one of the resistor circuits is coupled in parallel with a first one of the capacitor circuits to form a first network, a second one of the resistor circuits is coupled in series to a second one of the capacitor circuits to form a second network, the first network is coupled between an input terminal and an input of the amplifier, and the second network is coupled between the input of the amplifier and an output of the amplifier.

8. The apparatus of claim 7, wherein at least one of the first resistor circuit and the second resistor circuit has an adjustable resistance value that is arranged to move the location of the zero in response to changes in the measurement signal.

9. The apparatus of claim 7, wherein the first resistor circuit and the second resistor circuit both have adjustable resistance values that are arranged to move the location of the zero in response to changes in the measurement signal.

10. The apparatus of claim 1, wherein the feedback circuit includes a zero adjustment circuit that comprises a controlled transconductance cell that is arranged to cooperate with a capacitor circuit to form a $g_m$-C type filter that has a time constant that is determined by $C/g_m$, wherein the time constant associated with the feedback circuit is responsive to changes in the measurement signal.

11. The apparatus of claim 10, wherein the controlled transconductance cell includes a control terminal that is responsive to a control current, and wherein the feedback circuit is arranged such that the control current is responsive to changes in the measurement signal.

12. The apparatus of claim 1, wherein at least one of the feedback circuit and the control circuit includes at least one zero adjustment circuit, wherein each of the zero adjustment circuits is configured to adjust the location of at least one zero in the loop transfer function in response to changes in the measurement signal.

13. The apparatus of claim 1, wherein the control circuit includes a zero adjustment circuit that comprises a controlled transconductance cell that is arranged to cooperate with a capacitor circuit to form a $g_m$-C type filter that has a time constant that is determined by $C/g_m$, wherein the time constant associated with the feedback circuit is responsive to changes in the measurement signal.

14. The apparatus of claim 1, wherein the control circuit corresponds to a PWM controller in the switching regulator, and the feedback circuit comprises a DSP block, wherein the DSP block is arranged to adjust the small-signal compensation of the switching regulator in response to changes in the measurement signal and the output signal from the switching regulator.

15. The apparatus of claim 14, wherein the measurement signal is related to a value associated with the inductor.

16. The apparatus of claim 1, wherein the feedback circuit and the control circuit are arranged in a common circuit.

17. The apparatus of claim 1, wherein the control circuit is arranged to cooperate with the inductor such that the switching regulator operates as at least one of: a buck regulator, a boost regulator, and a buck-boost regulator.

18. An apparatus for adjusting small-signal compensation in a switching regulator that includes an inductor and a switching circuit that is arranged to provide selective charging of the inductor, the apparatus comprising:

a measurement means that is arranged to provide a measurement signal ($V_1$) that in associated with operating conditions for the inductor;

a feedback means that is arranged to provide a feedback signal in response to an output signal that is associated with the switching regulator; and a control means that is arranged to provide a drive signal to the switching circuit to effect selective charging of the inductor, wherein the feedback means and the control means are arranged in a feedback loop of the switching regulator such that the switching regulator has a loop transfer function with a second-order pole and at least one zero, wherein a location associated with at least one zero is dynamically adjusted by at least one of the feedback means and the control means in response to the measurement signal to counteract the effect of the second-order pole on stability of the switching regulator.

19. The apparatus of claim 18, wherein the feedback means and the control means are arranged in a common circuit.

20. The apparatus of claim 18, wherein the control means is arranged to cooperate with the inductor such that the switching regulator operates as at least one of: a buck regulator, a boost regulator, and a buck-boost regulator.

21. A method for adjusting small-signal compensation in a switching regulator that includes an inductor and a switch means, the method comprising:

measuring a parameter associated with the inductor;

monitoring an output signal that is associated with a feedback loop in the switching regulator; and dynamically adjusting at least one zero in response to the measured parameter with a zero adjustment circuit, wherein each zero is associated with a closed-loop transfer function for the feedback loop in the switching regulator such that instabilities from a second-order pole in the loop transfer function is counteracted by the zero adjustment circuit.

22. The method of claim 21, wherein the measured parameter corresponds to a value associated with the inductor, and the zero adjustment circuit is arranged to dynamically adjust the small-signal compensation based on the measured value associated with the inductor.

23. The method of claim 21, wherein the zero adjustment circuit is implemented by at least one of a portion of a DSP block, and an analog function block.

* * * * *

UNITED STATES PATENT AND TRADEMARK OFFICE
CERTIFICATE OF CORRECTION

PATENT NO. : 6,952,093 B1
DATED : October 4, 2005
INVENTOR(S) : Michael Eugene Broach et al.

It is certified that error appears in the above-identified patent and that said Letters Patent is hereby corrected as shown below:

Column 3,
Line 6, "related to one another by: $\Delta I_L/\Delta t = \Delta V_t/L$." should read -- related to one another by: $\Delta I_L/\Delta t = \Delta V_L/L$. --.

Column 9,
Line 63, "that in associated" should read -- that is associated --.

Column 10,
Line 20, "one of: on" should read -- one of: an --.

Column 12,
Line 2, "that in associated" should read -- that is associated --.

Signed and Sealed this

Fourth Day of April, 2006

JON W. DUDAS
*Director of the United States Patent and Trademark Office*